UNITED STATES PATENT OFFICE.

PIERRE DEFAUCAMBERGE, OF PARIS, FRANCE, ASSIGNOR TO SOCIETE FRANCAISE DE LA VISCOSE, OF PARIS, FRANCE, A CORPORATION OF FRANCE.

MANUFACTURE OF PRODUCTS CONTAINING INDIA-RUBBER AND CELLULOSE.

943,658.               Specification of Letters Patent.      Patented Dec. 21, 1909.

No Drawing.          Application filed March 22, 1909. Serial No. 485,090.

*To all whom it may concern:*

Be it known that I, PIERRE DEFAUCAMBERGE, citizen of the French Republic, residing at Paris, Department of the Seine, in France, have invented certain new and useful Improvements in the Manufacture of Products containing India-Rubber and Cellulose; and I do hereby declare the following to be a full, clear, and exact description of the invention, such as will enable others skilled in the art to which it appertains to make and use the same.

Heretofore experiments with a view to mixing Para rubber with viscose, and therefore with cellulose, for preparing a new product of which the physical properties (elasticity, tenacity, non-conductiveness of electricity, etc.) would participate of the properties of cellulose, and of india rubber, have not been successful. The solvents generally used to dissolve india rubber, such as benzin and carbon sulfid, will not dissolve either the sodic xanthogenat or its alkaline solution (viscose).

I have discovered that if an india rubber solution such as is found in nature *i. e.* the latex, is used in place of the solvents mentioned above, the result is quite different, and the homogeneous mixing will take place very successfully. The viscose and the latex form a mixture that can be kept long enough without alteration to allow the different operations of manufacture to take place.

The reactions which take place in treating the viscose by coagulating it by means of fixation baths as generally employed for precipitating the cellulose contained in the viscose also take place in treating the mixture by these baths and the same effects are produced. The mixture can be effected in any proportions and the proportions chosen depend on the characteristics that are desired in the article to be manufactured. The coagulation is produced, for instance, by sulfate of ammonia (Stearn's process) and the fixation is effected by heating or by the use of diluted mineral acids, such as sulfuric acid and chlorhydric acid. The washing which follows these operations takes place in hot or cold water.

The mixture of india rubber with cellulose is obtained not only with the solution of viscose but also with other solutions of cellulose, for instance with the ammoniacal solution of cupric oxid (Schweizer liquor). The properties such as buoyancy, elasticity, and the like can be obtained in any desired degree, by treating the product by vulcanization as is the case with other products containing india rubber. Such vulcanization is effected in the usual way by heating the mixture with vapors of sulfur or by treating the mixture at a low temperature with chlorid of sulfur.

I claim:—

1. A process of manufacturing products containing cellulose and india rubber, which consists in combining the india rubber latex with cellulose.

2. A process of manufacturing products containing cellulose and india rubber, which consists in mixing a solution of cellulose with the india rubber latex.

3. A process of manufacturing products containing cellulose and india rubber, which consists in combining viscose with the india rubber latex.

4. A process of manufacturing products containing cellulose and india rubber, which consists in mixing the india rubber latex and cellulose, coagulating the mixture, and then washing the product, as described.

5. A process of manufacturing products containing cellulose and india rubber, which consists in mixing the india rubber latex with a solution of viscose, coagulating the mixture by fixation baths, washing the product, and finally vulcanizing the same.

In testimony whereof I affix my signature, in presence of two witnesses.

PIERRE DEFAUCAMBERGE.

Witnesses:
   H. C. COXE,
   ENRIK KLOK.